(12) United States Patent
Finkenwirth et al.

(10) Patent No.: US 8,376,117 B2
(45) Date of Patent: Feb. 19, 2013

(54) MACHINING CENTER HAVING AN ASSOCIATED PALLET STORE AND PALLET HANDLING SYSTEM

(75) Inventors: Klaus Finkenwirth, Aitrang (DE); Klaus Lingenhöl, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 568 days.

(21) Appl. No.: 12/527,497

(22) PCT Filed: Dec. 21, 2007

(86) PCT No.: PCT/EP2007/011376
§ 371 (c)(1),
(2), (4) Date: Aug. 17, 2009

(87) PCT Pub. No.: WO2008/098609
PCT Pub. Date: Aug. 21, 2008

(65) Prior Publication Data
US 2010/0089719 A1    Apr. 15, 2010

(30) Foreign Application Priority Data
Feb. 16, 2007  (DE) .................... 20 2007 002 351 U

(51) Int. Cl.
*B65G 47/00*  (2006.01)
(52) U.S. Cl. .................................... 198/339.1
(58) Field of Classification Search .............. 198/860.1, 198/860.4, 860.5, 339.1
See application file for complete search history.

(56) References Cited

U.S. PATENT DOCUMENTS

| | | | | |
|---|---|---|---|---|
| 3,995,752 | A * | 12/1976 | Tamura et al. | 414/282 |
| 4,330,056 | A * | 5/1982 | Marino | 198/860.5 |
| 4,626,160 | A * | 12/1986 | Shiomi et al. | 414/222.06 |
| 4,747,193 | A * | 5/1988 | Hashidate et al. | 29/33 P |
| 5,015,139 | A * | 5/1991 | Baur | 414/281 |
| 5,062,195 | A * | 11/1991 | Binder | 483/15 |
| 5,125,149 | A * | 6/1992 | Inaba et al. | 29/430 |
| 5,178,506 | A * | 1/1993 | Meschi | 414/268 |
| 6,997,495 | B1* | 2/2006 | Groezinger | 296/26.15 |
| 7,226,403 | B2* | 6/2007 | Konvicka et al. | 483/14 |
| 7,810,285 | B1* | 10/2010 | Liptak | 52/69 |

FOREIGN PATENT DOCUMENTS

| | | |
|---|---|---|
| AT | 304359 | 4/1972 |
| DE | 102004031929 | 1/2006 |
| EP | 1084794 | 3/2001 |
| EP | 1712329 | 10/2006 |
| JP | 6-63836 | 3/1994 |

* cited by examiner

*Primary Examiner* — Gene Crawford
*Assistant Examiner* — William R Harp
(74) *Attorney, Agent, or Firm* — Dilworth & Barrese, LLP.

(57) ABSTRACT

The present invention relates to a machining center having an associated pallet store and pallet handling system, wherein the machining system is separated from the pallet store by means of a travel path on which the pallet handling device can be moved for the transfer of the pallets, with the travel route being able to be bridged via a part serving as a platform to enable access to the machining center.

20 Claims, 3 Drawing Sheets

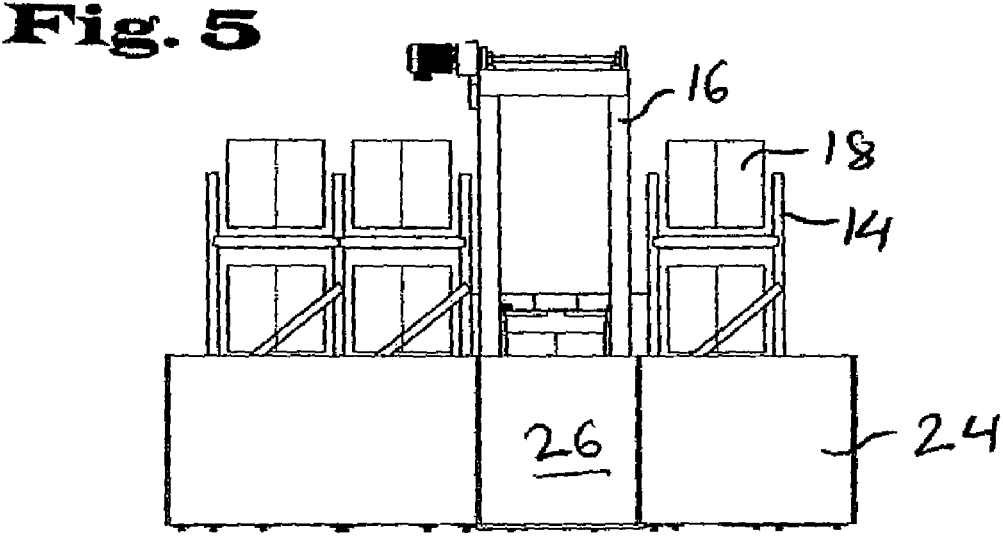
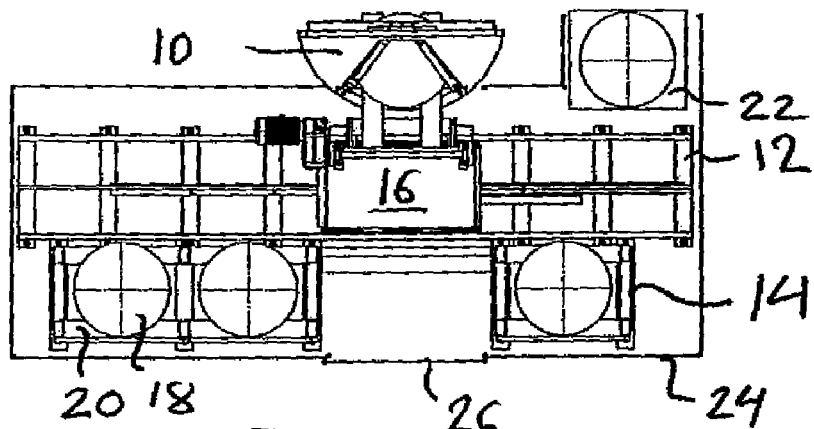
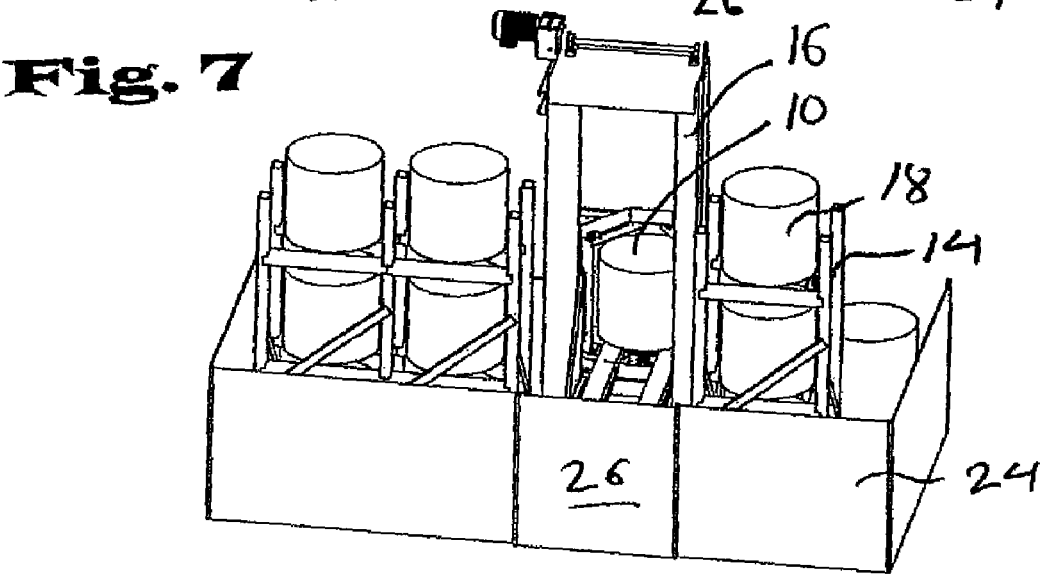

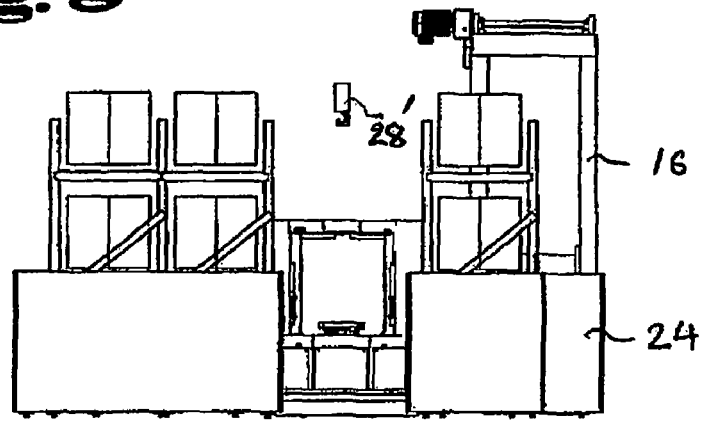
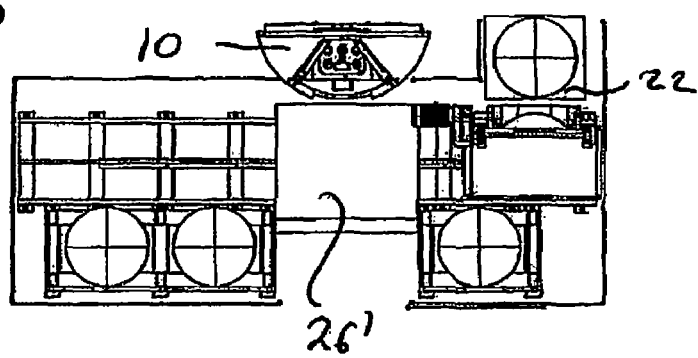
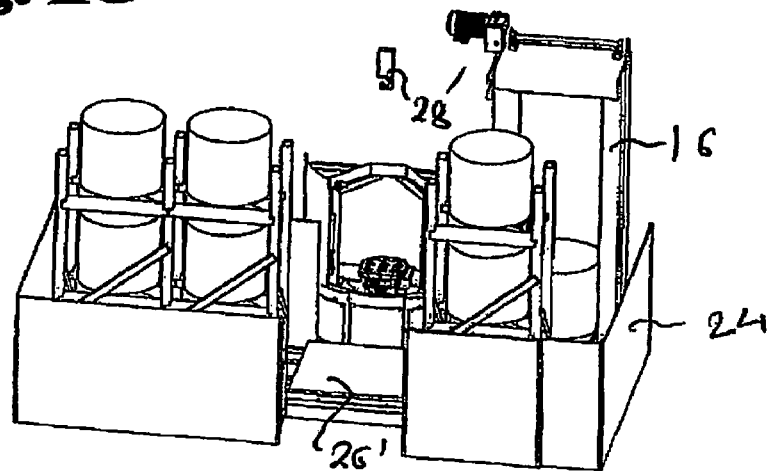

MACHINING CENTER HAVING AN ASSOCIATED PALLET STORE AND PALLET HANDLING SYSTEM

The invention relates to a machining center having an associated pallet store and pallet handling system.

Pallet stores and pallet handling systems including accessible palleting storage positions for the setting up and for the control of the workpieces are required for machining centers for unmanned operation.

BACKGROUND OF THE INVENTION

A corresponding workpiece which is supplied via a pallet handling system and which is removed again after the machining is as a rule machined using cutting tools in the machining center. The automatic loading and unloading of the machining center with the pallet including the workpiece takes place from the front by the pallet handling system. For this purpose, the pallet handling system can move along the pallet stores associated with the machining center and can take corresponding pallets out of the pallet stores and supply them to the machining center. Conversely, pallets with machined workpieces can accordingly be removed from machining centers and can be supplied to a corresponding pallet position again. In addition, the workpiece can be placed on a corresponding setting up station or control station (SPC station).

The pallet handling system travels on a travel path which is arranged between the machining center and the pallet store. A safe manual loading of the machining center is hereby not possible since the corresponding operator would necessarily be standing in the protected zone of the pallet handling system and additionally on the travel path of the pallet handling system.

SUMMARY OF THE INVENTION

It is the object of the present invention to provide a machining center having an associated pallet store and having an associated pallet handling system which also allows a manual loading and unloading of the machining center in addition to the automatic loading of the machining center.

This object is solved by the combination of the features herein.

In accordance with this solution, a machining center with an associated pallet store and with an associated pallet handling system is provided in which the machining system is separated from the pallet store by means of a travel path on which the pallet handling device can be moved for the transfer of the pallets. The travel route can be bridged via a part serving as a platform to enable access to the machining center and to provide a stand for the operator.

Preferred embodiments of the invention result from the subordinate claims dependent on the main claim.

For safety reasons, the pallet store is surrounded by a partition wall, with the part serving as a platform being able to be a part of this partition wall.

The machining center with the associated palleting store and the pallet handling system is advantageously secured by the partition wall in automatic operation so that no operator can move into the working zone without authorization during the automatic moving to and fro of the pallet handling system. For the case of a manual loading and unloading of the machining center, a platform is formed by the moving part which, on the one hand, allows the operator access to the inner zones of the pallet handling system and, on the other hand, provides a secure stand in front of the machining center for the operator. The pallet store is cut out in the region of the platform and of the entrance provided in the partition wall so that a pallet with a workpiece can be moved to the machining center in this region e.g. via a lifting hook of a crane system and can there be handled by the operator in the desired manner. The pallet with workpiece is in this respect placed onto the loading position of the machining center from the front.

The machining center is thus manually loadable and unloadable and operable in accordance with the embodiment variant presented here.

The travel path can accordingly comprise floor rails. In accordance with a further advantageous embodiment of the invention, the pallet store can comprise a high rack store.

A setting up station and/or a control station, i.e. a so-called SPC station, can be provided in addition to the machining center.

Like the machining center, the control station or the setting up station can likewise be automatically loadable.

A control is advantageously present for production management and pallet management.

The part of the partition wall serving as the platform can be movable in rotary or linear form.

The pallet handling system is preferably a lift stacking vehicle.

With shelves of a high construction, it is particularly advantageous if the lift stacking vehicle is, on the one hand, supported or held on the floor rail and, on the other hand, at a guide rail arranged at the pallet store. This guide rail is preferably arranged in the upper region of the lift stacking vehicle.

In accordance with a further preferred embodiment of the invention, the guide rail can be opened via a mechanism in the region of the platform. Alternatively a gap can also be left at this position if the engagement elements of the lift stacking vehicle are dimensioned such that it is possible to travel over the gap. As a result of this, the lifting hook of a crane can also be traveled inwardly in the direction of the machining center in this region to bring along a pallet with a workpiece for loading, for example.

BRIEF DESCRIPTION OF THE DRAWINGS

Further features, details and advantages of the invention will be explained in more detail with reference to an embodiment shown in the drawing. There are shown:

FIGS. 5-10: representations in accordance with FIG. 1 with a second alternative embodiment of the machining center in accordance with FIGS. 1 to 4.

DESCRIPTION OF THE PREFERRED EMBODIMENTS

Figure 1:
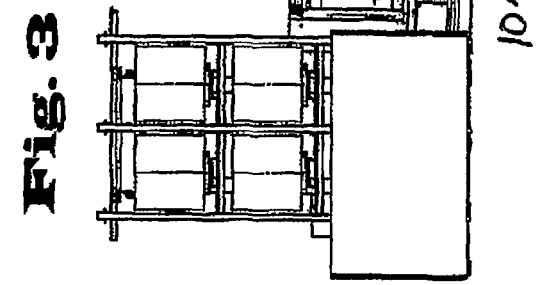
FIGS. 1-4: views of a first embodiment of a machining center having an associated pallet store and pallet handling system in accordance with a first embodiment of the present invention.
Figure 2:
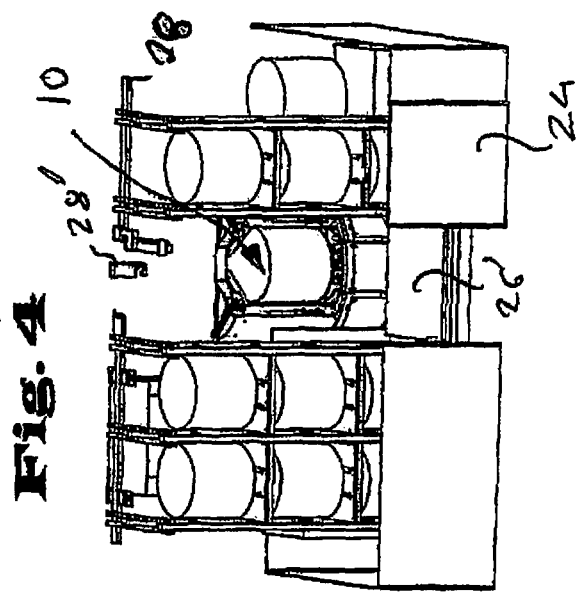

A machining center 10 is shown in FIGS. 1 to 10 which is spaced apart from a pallet stack 14 made as a high rack store via a floor rail 12. A pallet handling device made as a lift stacking vehicle 16 with which the pallets 20 loaded with workpieces 18 can be taken from the pallet store 14 and can be supplied to the machining center 10 travels along the floor rails 12. Conversely, completely or partly machined workpieces 18 can be transported back again accordingly with the associated pallets 20 into the pallet store 14.

In particular in FIGS. 6 and 9, a setting up station 22 is arranged next to the machining center and the workpiece can be set up in it before being moved into the machining center 10. Additionally or alternatively, this station 22 can also serve as a control station, a so-called SPC station.

As in particular shown in FIGS. 5 and 7, the machining center and the pallet store are surrounded by means of a partition wall 24. A part 26 of this partition wall is made as a part which can be folded down. This part which can be folded down is provided opposite the machining center 10. The region between the machining center and the part 26 of the partition wall 24 which can be folded down is left open by the pallet store 14. The part 26 of the partition wall 24 which can be folded down is movable in the region via a pivot and/or linear movement such that it can be placed over the floor rails 12 of the lift stacking vehicle 16 while releasing an access in the partition wall 24 so that, as shown in FIGS. 9 and 10, a platform 26' arises on which the operator can stand for the manual operation of the machining center 10. An access for the operator is hereby provided, on the one hand. On the other hand, a working platform is formed above the floor rails.

When the machining center is configured for manual loading, as is shown in FIGS. 8, 9 and 10, a pallet with workpiece can be supplied via a lifting hook 28' such as is shown purely schematically in FIGS. 8 and 10.

An alternative embodiment variant of that in accordance with FIGS. 5 to 10 is shown in FIGS. 1 to 4. The same parts are provided with the same reference numerals. The difference of this embodiment variant from that in accordance with FIGS. 5 to 10 lies in the fact that the lift stacking vehicle 16 here moves, on the one hand, on floor rails, whereas it runs along a guide rail 28 arranged at the pallet store 14 at its upper region. A comparatively higher stability of the lift stacking vehicle is hereby ensured which also allows a higher construction height of the pallet store 14.

Figure 3:
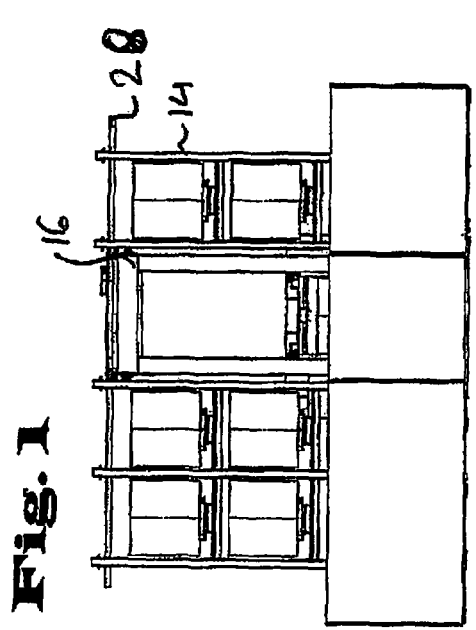
Figure 4:
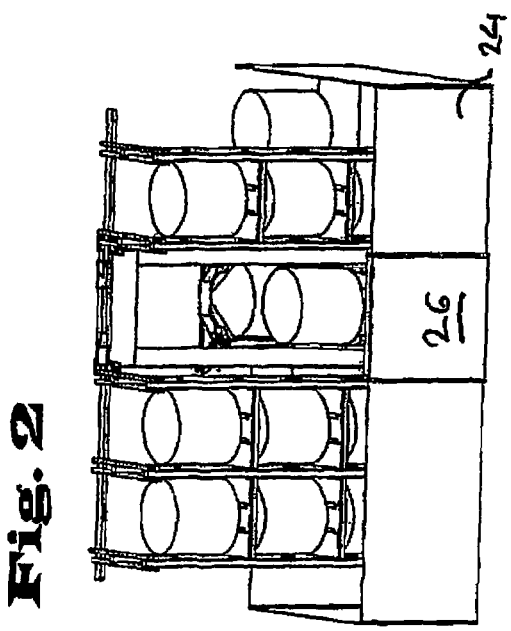

To now allow a supply of a workpiece via a lifting hook 28' during manual operation, as is shown in FIGS. 3 and 4, the region of the guide rail 28 which is disposed above the part 26 of the partition wall 24 which can be folded down must be opened, as is shown in FIGS. 3 and 4. In this respect, a part of the guide rail 28 can be made to be able to be folded down, as can in particular be seen from FIG. 4.

The invention claimed is:

1. A machining center (10) having an associated pallet store (14) and pallet handling device (16), wherein
   a travel path separates the machining center (10) from the pallet store (14),
   the pallet handling device (16) is movably arranged on the travel path for transfer of pallets (20), and
   a part (26) is movably arranged to movably bridge the travel path and serve as a platform (26') for accessing the machining center (10).

2. A machining center in accordance with claim 1, wherein the pallet store is surrounded by a partition wall.

3. A machining center in accordance with claim 2, wherein the part bridging the travel route is made as part of the partition wall, with it being able to be moved out of its position integrated in the partition wall into the position bridging the travel route.

4. A machining center in accordance with claim 3, wherein the movement of the part takes place by folding down or by a sliding movement.

5. A machining center in accordance with claim 4, wherein the travel path comprises floor rails.

6. A machining center in accordance with claim 2, wherein the movement of the part takes place by folding down or by a sliding movement.

7. A machining center in accordance with claim 1, wherein the part bridging the travel route is made as part of the partition wall, with it being able to be moved out of its position integrated in the partition wall into the position bridging the travel route.

8. A machining center in accordance with claim 7, wherein the movement of the part takes place by folding down or by a sliding movement.

9. A machining center in accordance with claim 7, wherein the travel path comprises floor rails.

10. A machining center in accordance with claim 8, wherein the travel path comprises floor rails.

11. A machining center in accordance with claim 1, wherein the movement of the part takes place by folding down or by a sliding movement.

12. A machining center in accordance with claim 1, wherein the travel path comprises floor rails.

13. A machining center in accordance with claim 1, wherein the pallet store comprises a high rack store.

14. A machining center in accordance with one claim 1, wherein a setting up station and/or a control station (SPC station) are additionally provided.

15. A machining center in accordance with claim 1, wherein it and/or the setting up station and/or the control station can be loaded automatically.

16. A machining center in accordance with claim 1, wherein a control is present for the production management and pallet management.

17. A machining center in accordance with claim 1, wherein the pallet handling device is a lift stacking vehicle.

18. A machining center in accordance with claim 17, wherein the lift stacking vehicle is supported or held, on the one hand, on one of floor rails and, on the other hand, at a guide rail arranged at the pallet store.

19. A machining center in accordance with claim 18, wherein the guide rail can be opened in the region of the foldable platform via a device.

20. A machining center having an associated pallet store and pallet handling device, wherein
   the machining center is separated from the pallet store by a travel path on which the pallet handling device can be moved for the transfer of the pallets, with the travel path being able to be bridged via a part serving as a platform to enable access to the machining center,
   the pallet handling device is a lift stacking vehicle supported or held, on the one hand, on a floor rail and, on the other hand, at a guide rail arranged at the pallet store, and
   the guide rail has a gap which can be traveled over by the lift stacking vehicle in the region of the foldable platform.

* * * * *